Figure 5:
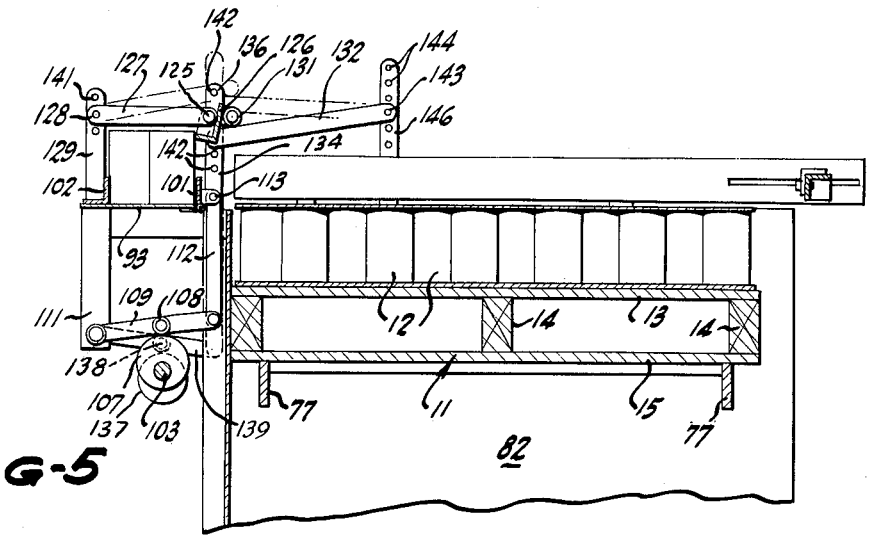

Nov. 23, 1965                E. E. JEREMIAH                3,219,203
                       MACHINE FOR PALLETIZING CANS
Filed Feb. 28, 1963                                      5 Sheets-Sheet 1
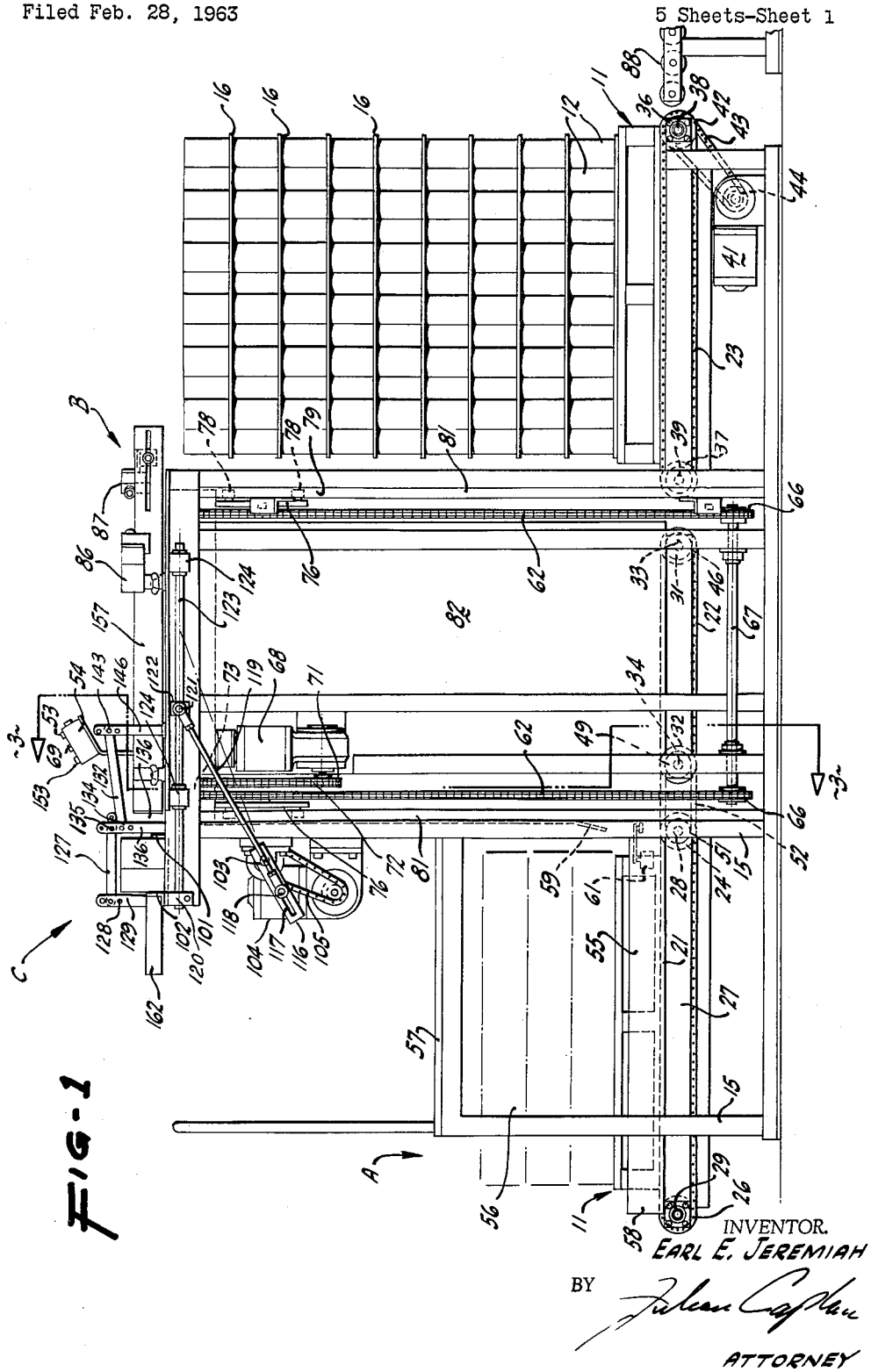
INVENTOR.
EARL E. JEREMIAH
BY
ATTORNEY

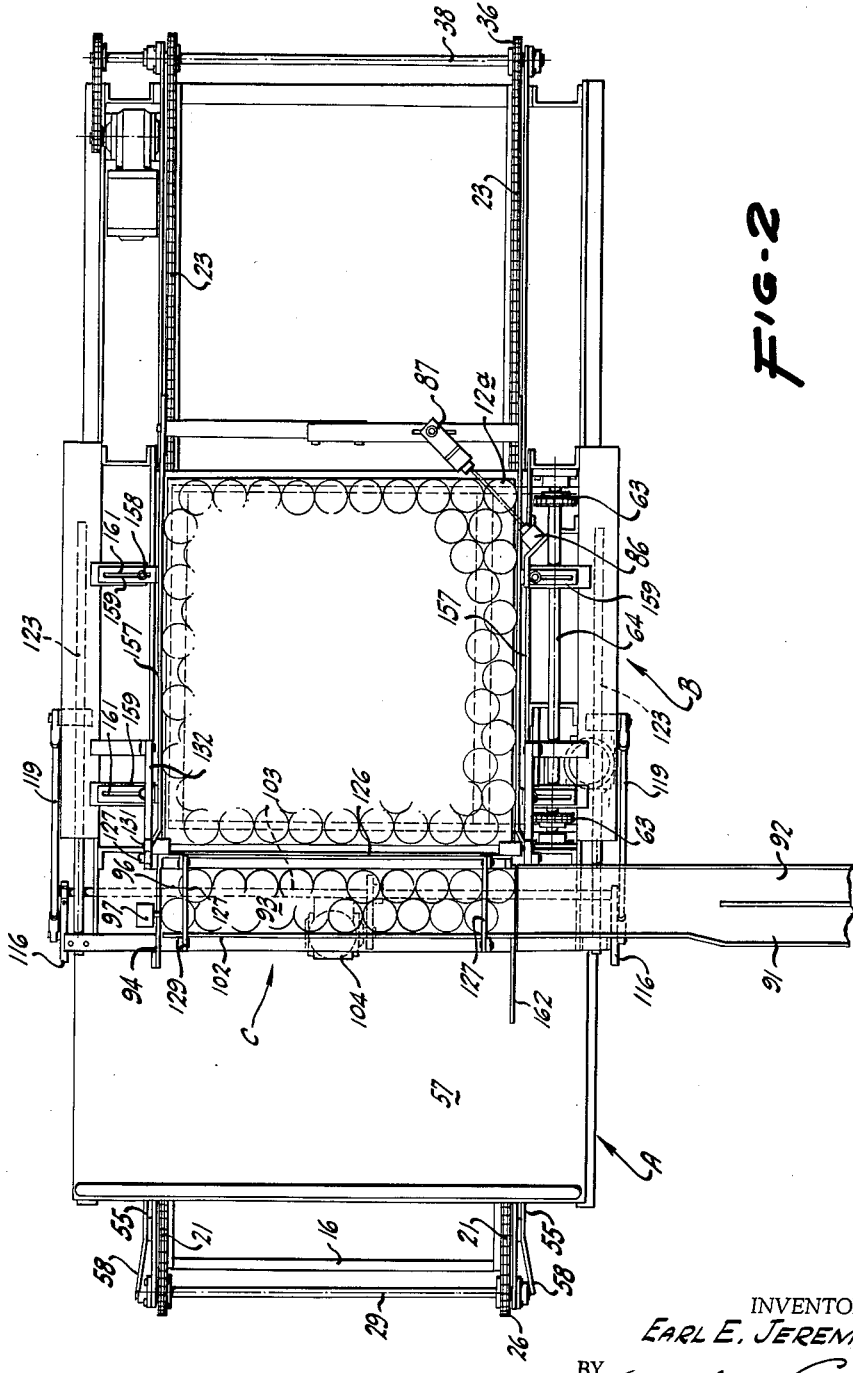

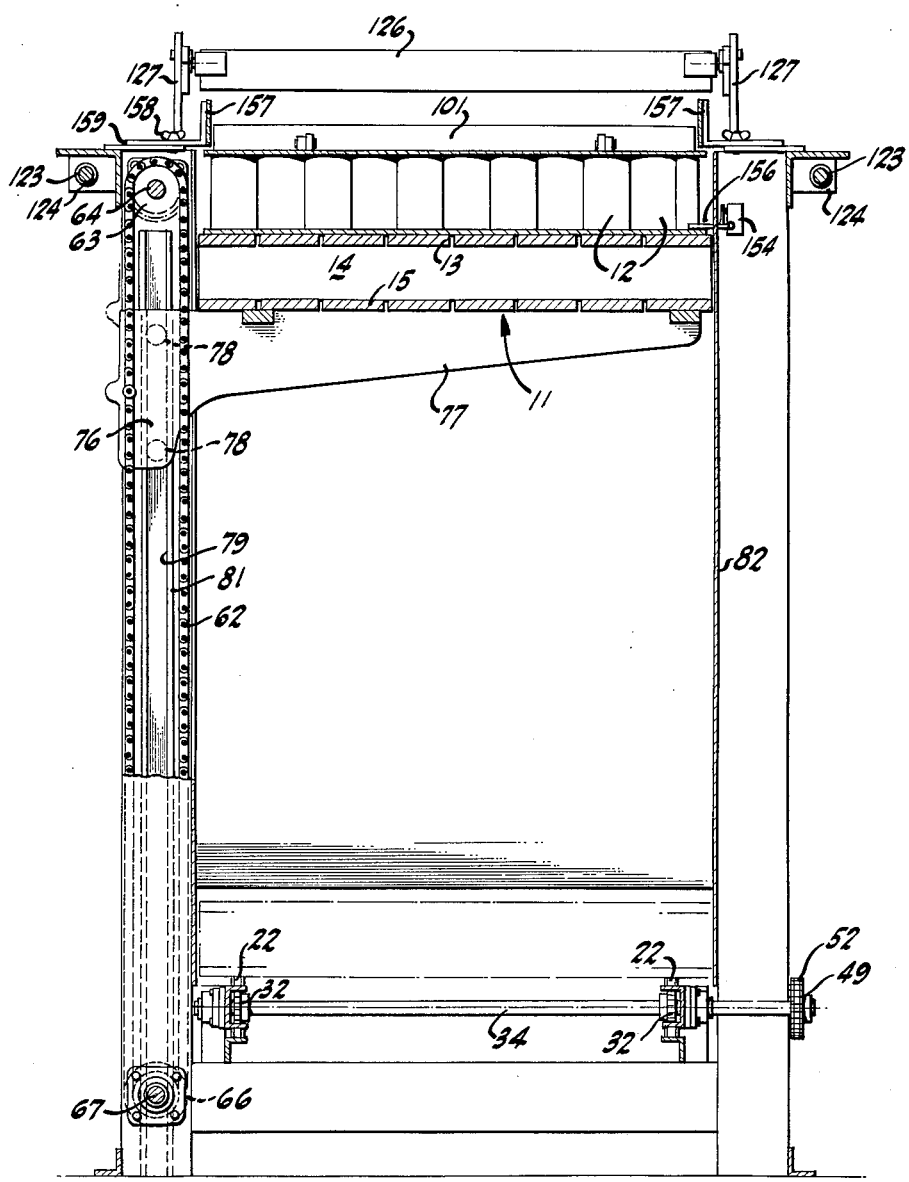

INVENTOR.
EARL E. JEREMIAH
BY
ATTORNEY

Nov. 23, 1965  E. E. JEREMIAH  3,219,203
MACHINE FOR PALLETIZING CANS
Filed Feb. 28, 1963  5 Sheets-Sheet 5

INVENTOR.
EARL E. JEREMIAH
BY Julian Caplan
ATTORNEY

United States Patent Office 3,219,203
Patented Nov. 23, 1965

3,219,203
MACHINE FOR PALLETIZING CANS
Earl E. Jeremiah, Los Altos, Calif., assignor to National Can Corporation, Chicago, Ill.
Filed Feb. 28, 1963, Ser. No. 261,612
8 Claims. (Cl. 214—6)

This application is a continuation-in-part of my copending applications, Serial No. 850,319 filed November 2, 1959, and Serial No. 234,198, filed October 30, 1962, both applications now abandoned.

This invention relates to a new and improved machine for palletizing cans and is characterized by the fact that a plurality of rows of cans (as long as the width of the pallet) is fed horizontally onto the pallet or onto a separator placed on top of a layer of cans previously loaded on the pallet, and that a second plurality of cans is fed horizontally, pushing the first rows ahead, and the horizontal feeding of pluralities of rows is continued until the entire pallet is filled. The pallet is then depressed the height of one can, a separator placed on top of the previous layer of cans and pluralities of rows of cans fed sequentially horizontally until the second layer is completely filled, the operation being continued layer by layer until the desired height is attained.

The present invention relates to a means for reducing the labor cost in handling cans from the can factory to the vehicle in which they are to be transported to the cannery and from the vehicle into the cannery. For such purpose, instead of the cans being handled loosely and manually, cans are stacked on a pallet, and the pallet conveniently moved by fork-lift truck from place to place until the pallet is unloaded. Thus, in accordance with the present invention the cans are stacked in layers on a pallet whereupon they may be moved into a truck or freight car, transported to the cannery, then removed from the vehicle by a fork-lift truck to a warehouse and finally moved from the warehouse to the point at which they are to be filled. Heretofore, cans have commonly been handled by means of forks having a plurality of tines which fit into the open mouths of the can so that they are lifted to or from a conveyor into or from a stack. The present invention eliminates the manual labor involved in such operations.

One of the particular features of the present invention is the fact that the palletizing machine is simple in construction and yet operates at very high speeds, so that a single machine can palletize the output of several can lines.

A still further feature of the invention is the provision of means on the machine to prevent cans from tipping as they are moved horizontally, first in one direction and then transversely to the first direction of movement. Positive means is employed to hold the cans in upright position at all times, thereby eliminating the possibility that the cans will tip and become damaged or destroy the outline of the stack on the pallet.

A still further feature of the invention is the provision of adjustable means on the machine to accommodate cans of different diameters and of different heights.

A still further feature of the invention is the provision of means which insures that the alternate rows of cans will be staggered prior to moving onto the pallet so as to accommodate the maximum number of cans for a given size pallet.

An additional feature of the invention relates reduction in vibration of the machine by reduction in weight of reciprocating parts and substitution of rotary mechanical movements.

Still another improvement relates to elevator means for raising and lowering the pallet. Lift forks similar to those used on lift trucks are located on one side of the machine and raised and lowered together. Such arrangement reduces tendency of the elevator to bind or move out of vertical alignment. The horizontal conveyor chains which feed pallets into and away from the elevator station are interrupted at the fork locations to permit the forks to be depressed to the level of the conveyor chains.

A further feature of the invention relates to a control for the elevator mechanism. Interruption of a beam of light directed upon a photo-electric cell by pushing of the last row of cans of each layer into the beam causes the elevator to lower. When the top edge of the cans is sufficiently depressed, the beam is no longer interrupted and the elevator stops.

Other objects of the present invention will become apparent upon reading the following specification and referring to the accompanying drawings in which similar characters of reference represent corresponding parts in each of the several views.

Figure 4:
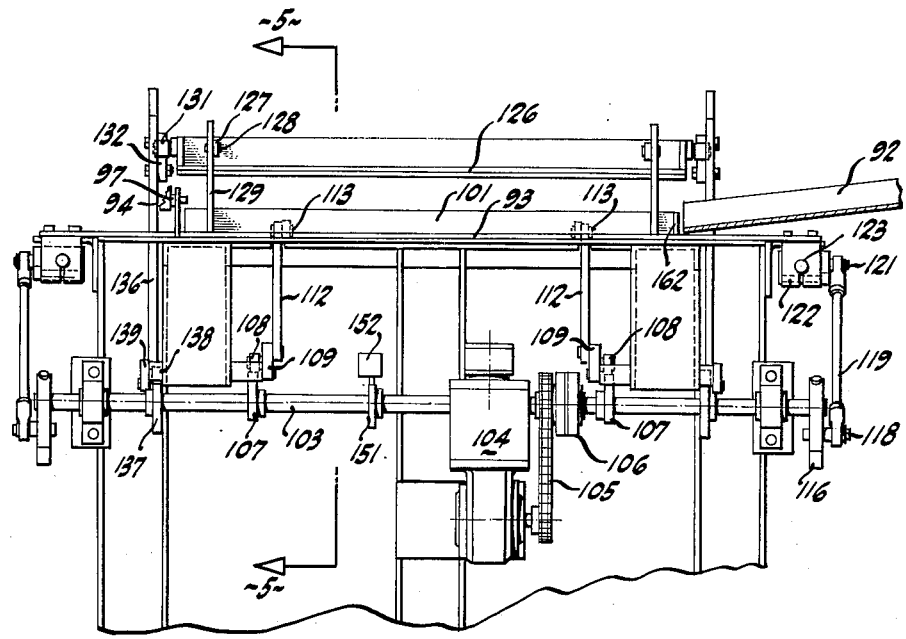
Figure 6:
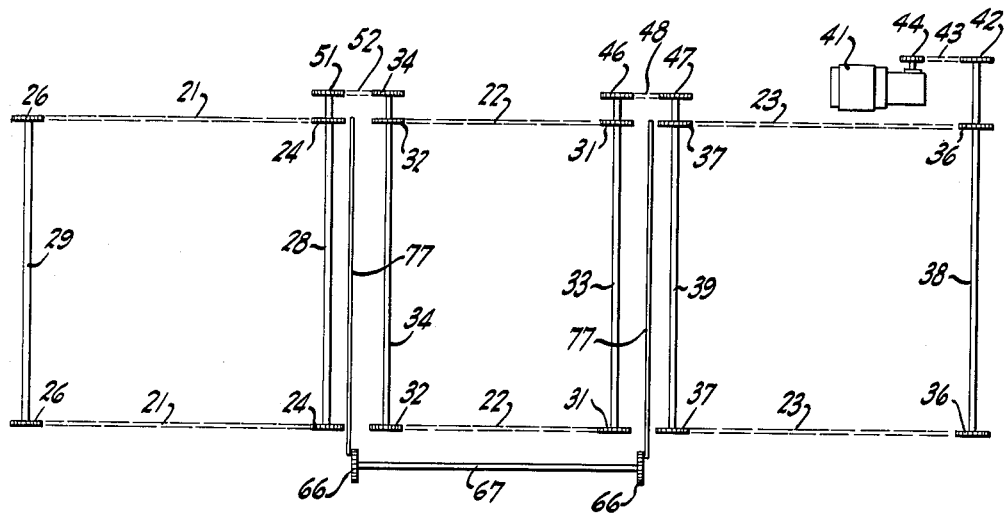
Figure 7:
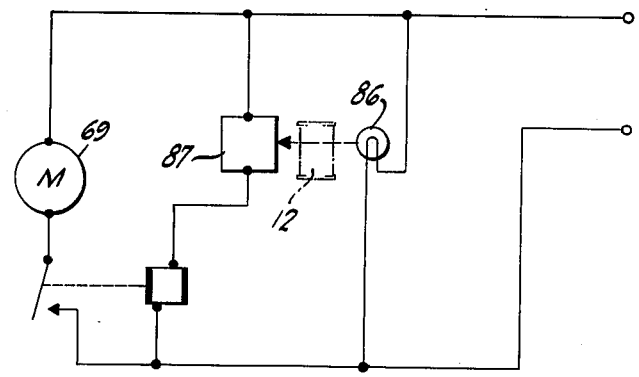

In the drawings:
FIG. 1 is a side elevation of the machine.
FIG. 2 is a top plan thereof.
FIG. 3 is a vertical sectional view taken substantially along line 3—3 of FIG. 1.
FIG. 4 is a fragmentary enlarged front elevation.
FIG. 5 is a sectional view taken substantially along line 5—5 of FIG. 4.
FIG. 6 is a schematic plan view of the horizontal transfer shafts, chains and sprockets and the motor therefor.
FIG. 7 is a simplified schematic wiring diagram of a portion of the electrical circuit of the machine.

The present invention is used to load on a pallet 11 rows of metal cans 12. Pallet 11 consists essentially of a horizontal platform 13, which is supported above the floor by depending legs 14 which are spaced apart to accommodate the forks of a lift-truck, so that the pallet 11 and its contents may be transported from place to place. Legs 14 rest upon base 15. The lowermost layer of cans is deposited on the platform 13 and consists of a plurality of rows of cans 12, each row being staggered with relation to the adjacent row, a distance equal to one-half the can diameter so as to accommodate the largest number of cans for a given size pallet. As hereinafter appears, in accordance with this invention, two rows of cans may be indexed onto the pallet at a time and sequentially additional pairs of rows are indexed behind the first until the entire width of the pallet is filled. Thereupon the operator places a cardboard or paper separator 16 over the top of the first layer of cans and pallet 11 is depressed a distance equal to the height of the can. Thereupon, the indexing of pairs of rows of cans is resumed until the second layer is filled and thereafter separators and additional layers of cans are added until a practical maximum limit is reached. When the maximum limit is reached, the pallet is removed from the machine and an outside covering (not shown) is applied which prevents the cans from falling and protects from atmospheric condition or damage.

Essentially, the present machine consists of a pallet horizontal transfer station A, a pallet elevating station B, and can loading station C.

Pallet transfer station A consists of three pairs of horizontally disposed continuous chains 21, 22, 23, one chain of each pair on each side of the machine. A gap exists between the middle chain 22 and the chains 21 and 23 at each end to accommodate projecting proportions of the elevator station B, as hereinafter appears. The forward pair of chains 21 pass around drive sprocket 24 and idler sprocket 26 on opposite ends of horizontally longitudinally disposed spacing bar 27. Transverse horizontal shafts 28, 29 carry sprockets 24, 26 adjacent opposite ends thereof so that the chains 21 on each side move in unison. The middle chains 22 are similarly directed around drive and idler sprockets 31, 32 on transverse shafts 33, 34, respectively. The rearward chains 23 pass around drive and idler sprockets 36, 37 on transverse shafts 38, 39, respectively. Motor 41 turns rear drive sprocket 42 on shaft 38 through chain 43 and sprocket 44 on the motor drive shaft. Idler shaft 39 of rear chains 23 drives sprocket 46 on drive shaft 33 of the middle chains 22 through sprocket 47 and inter-connecting chain 48 which are laterally outwardly displaced to clear the mechanism of the elevator station B hereinafter described. Similarly, middle idler shaft 34 drives forward drive shaft 28 through sprocket 49 and 51 and inter-connecting chain 52, which are likewise laterally outwardly displaced for a similar purpose. Motor 41 is controlled by the operator through a button 53 on control panel 54.

A stack of pallets 11 is deposited in the space 56 at the front of the machine under operator's platform 57, and as the previous pallet is fed into the machine by longitudinal movement of chains 21, the next pallet drops down between the side guides 55 disposed vertically on either side of the machine, the forward edges 58 of the side guides 55 flaring outwardly to facilitate ingress of the pallets when they are being loaded from a truck. Depending bars 59 prevent more than one pallet 11 from advancing into the machine. Chains 21 move forwardly the lowermost pallet from the pallet loading station A into the elevator station B, where the pallet rests upon chains 22. There is a limit switch 61 which stops the movement of motor 41 when the pallet has moved the required distance into the machine. Subsequently, after the pallet is fully loaded and deposited back on chains 22, the chains 23 move the filled pallet to the rear of the machine as the next empty pallet is brought from space 56 to the elevator station B.

The elevator station B consists of a pair of vertically disposed continuous chains 62 on the right-hand side of the machine which are driven by drive sprockets 63 on horizontal longitudinally extending drive shaft 64 at the top of the machine, and extend around idler sprockets 66 on horizontal longitudinally extending idler shaft 67 at the bottom of the machine. Chains 62 are driven from a reversible drive motor 68 controlled by button 69 at the control panel 54, which motor 68 drives sprocket 71 which in turn drives chain 72 which drives a sprocket 73 on the shaft 64. Each chain 62 is connected to vertically slidable lifting member 76 which is an inwardly-extending plate having at its inner end lift fork 77 which slips under the base 15 of pallet 11. Lifting member 76 has a pair of rollers 78 which fit into a vertical groove 79 in vertical guide member 81 on the frame of the machine. The gap between chains 21, 22, 23 accommodates plate 76 and forks 77.

To prevent cans from falling sideward off the pallet, sheet metal sides 82 are positioned on each side of the machine, the sides having vertical slots through which lifter members 76 project.

Motor 68 is reversible so that after a layer of cans is deposited on the pallet 11, the chains 62 reverse a distance equivalent to the height of can 12, and this reversal movement is repeated until the pallet is completey filled, whereupon the pallet is lowered onto chains 22 and discharged to the rear of the machine.

Positioned adjacent one rearward corner of the elevator station B is a lamp 86 and a photo-electric cell 87. The beam of the lamp 86 is directed diagonally across the corner of the pallet at a level such that it is interrupted by a can 12 pushed to the rear corner of pallet 11. When the pallet 11 has been completely filled with a layer of cans by reason of the cans being serially pushed rearwardly at the loading station C, as hereinafter described, the rearmost can 12a intercepts the light beam and this causes interruption of the light striking the photoelectric cell 87 which in turn actuates the motor 68 of elevator to commence lowering forks 77. When the upper edge of can 12a is depressed so that the beam of lamp 86 again strikes the photoelectric cell 87, motor 68 is stopped and pallet 11 remains at this elevation until another layer of cans has completely filled the pallet, whereupon the depression of the elevator is repeated and repetition occurs until the pallet is completely loaded and the pallet has been depressed to the level of chains 22.

When the pallet has been moved out from underneath the elevator station B, it may be manually moved away as by means of roller conveyor 88 or may be removed by a lift-truck or other conveyance. It is desirable that the filled pallet be encased in a jacket, such as pieces of corrugated paper bent at right angles and covering two sides of the pallet and by means of a cover. Conventional steel strapping, wire strapping, gummed paper or other means may be employed to hold the two halves of the cardboard jacket together and hold the jacket in place on the pallet. This prevents the cans from falling out of their stacks and also prevents exposure to dust, atmospheric conditions and other foreign materials.

At the loading station C, the cans 12 are pushed onto the pallet 11. For such purpose, two parallel lines of cans are transferred into the machine through two parallel transversely extending chutes 91, 92 on one side of the machine preferably connecting with overhead conveyors (not shown), the cans coming into the machine upright and preferably with the open mouths uppermost. At the discharge point of the two chutes is a horizontal transversely extending plate 93 onto which the cans move, the weight of the succeeding cans pushing the cans all the way across the plate 93 to vertical end piece 94 at the opposite side. In order to stagger the cans, a pin 96 extends vertically upwardly from the far side of plate 93 and is positioned from vertical end piece 94, a distance equal to one-half the diameter of can 12, and further the pin 96 is positioned on the forward side of plate 93 so as to retard the forwardmost row of cans relative to the rearwardmost row, a distance equal to one-half the can diameter. Thus, the alternate rows of cans are staggered. For large diameter cans, a single row fills the width of plate 93 and pin 96 is eliminated. On the side of plate 93 opposite chutes 91, 92 is a limit switch 97 which is closed when a row of cans extends completely across the plate 93. Unless switch 97 is closed, the loading cycle of the machine cannot commence.

To prevent the cans from falling inwardly of the machine and off the plate 93, or from tipping while the rows are being loaded onto the plate, a swingable gate 101 is hinged to the inner edge of plate 93. While the cans are being loaded onto plate 93, gate 101 assumes a vertically upward position. However, at other times, gate 101 is moved to a horizontally inwardly extending position, the means whereby the gate is moved between the two positions being hereinafter set forth in detail.

The cans are prevented from falling off plate 93 in a forward direction during the loading operation by means of pusher bar 102, which at this point in the cycle of operation of the machine is stationary extending longitudinally along the forward side edge of plate 93.

The movement of gate 101 and of the pusher bar 102 is controlled by means of cam shaft 103, which is in turn controlled by motor 104 through belt 105 and clutch 106. Cam shaft 103 contains a plurality of cams. A pair of cams 107 on opposite sides of the machine controls gate 101 and for this purpose for each cam 107 a cam follower roller 108 is mounted on lever 109 and engages the surface of cam 107. Lever 109 is pivoted at one end to stationary member 111 along the front of the elevator station. The other end of lever 109 is pivotally connected to cam push rod 112, which is in turn connected by pin 113 to gate 101.

The movement of pusher bar 102 is controlled by cranks 116 on each end of shaft 103. In order to adjust the stroke of the pusher bar 102 depending upon the diameter of the cans 12 being loaded, each crank 116 has a radial slot 117. Bolt 118 fits into slot 117 and its radial distance from the center line of shaft 103 may be adjusted by loosening the bolt 118 moving it along the slot 117 and then retightening it. Bolt 118 has a pivotal connection to connecting rod 119. The opposite end of connecting rod 119 is pivotally connected by means of pins 121 to block 122 which is fixed to horizontal rod 123. Horizontal rod 123 reciprocates in ball bearing guides 124 which are fixed to the frame of the machine. The forward end of rod 123 is fixed by means of bracket 120 to transverse horizontal pusher bar 102. Pusher bar 102 functions to push the cans forwardly during the loading movement of the cycle of operation and, also, functions as a side guide when the cas are being loaded onto plate 93. As shaft 103 revolves, crank 116 also revolves and causes horizontal reciprocation of rod 123 and hence of pusher bar 102. The amplitude of movement is controlled by the position of bolt 118. The amplitude is such that for each stroke of pusher bar 102, a single or double row of cans 12 is pushed off plate 93 and onto the pallet 11. Selection of one or two rows of cans is dependent upon the diameter thereof.

To prevent the cans from tipping as they are pushed onto the pallet, a guide bar 126 extends transversely across the machine at the level of the top edges of the cans on plate 93 to engage on the lips of the innermost row of cans and moves ahead of the cans as the pusher bar 102 advances them into the machine. Bar 126 is connected by pin 125 to longitudinal link 127 which is connected by pin 128 to vertical arm 129 which is connected to pusher bar 102. To prevent interference of the cans when the pusher bar 102 retracts, guide bar 126 is raised so that it clears the upper ends of the cans. For such purpose, bar 126 carries an outwardly extending roller 131 at either end which rides on upwardly sloping ramp 132. Ramp 132 is pivoted at its rearward end by pin 143 to vertical leg 146. The opposite end of ramp 132 is pinned by pin 135 to vertically reciprocating pusher rod 136 which is caused to move upwardly in timed sequence to the cycle of operation of the machine by means of cam 137 on cam shaft 103. Follower roller 138 on lever 139 rides on cam 137, lever 139 being pivoted to support 111 in the same manner as lever 109. Thus, as bar 126 starts to retract, cam 137 causes ramp 132 to lift bar 126 above the level of the cans. Upon completion of retraction of bar 126, cam 137 drops the bar to its initial position.

To provide adjustability for different can heights, pin 128 may fit into various holes 141 in leg 129, and ramp 132 is adjustable at either end—i.e. pin 135 may fit into various holes 142 in rod 134 and pin 143 may fit into various holes 144 in outer support 146.

Cam shaft 103 also carries timer cam 151 which contacts switch 152. When the operator presses button 153 on control panel 54, and assuming that switch 154 is closed by reason of switch arm 156 on the frame being contacted by a pallet 11 raised to full upward position by elevator B, shaft 103 turns until it has completed one revolution, whereupon switch 152 under control of cam 151 breaks the circuit and de-clutches clutch 106 on motor 104.

As the pusher bar 102 advances the double row of cans, horizontal side guides 157 on either side of the path of movement of the cans prevent the cans from moving out of alignment, and for such purpose guides 157 are movable inwardly and outwardly depending upon the diameters of the cans and the consequent width of the layer of cans. Thus, guides 157 are connected by bolts 158 to brackets 159 on the frame, and brackets 159 have elongated slots 161 receiving such bolts 158 and affording the movability of guides 157. As pusher bar 102 advances on its inward stroke, trailing member 162 fastened thereto blocks the discharge of cans from chutes 91 and 92 until the pusher bar 102 has retracted to its initial position. This prevents cans from jamming behind the pusher bar. For each advance of the pusher bar 102, two rows of cans are fed rearwardly into the machine. Each succeeding pair of rows pushes the preceding rows across the width of the pallet.

When the farthermost can intercepts the beam from lamp 86 at the far end, clutch 106 is de-clutched as soon as the pusher bar 102 has retracted to initial position.

A stack of pallets 11 is deposited in the space 56. When the chutes 91 and 92 are filled, the operator pushes button 53 which advances the lowermost pallet along chains 21 from the pallet loading station A to the elevator station B and switch 61 stops such movement. When the pallet has reached this position, the operator pushes button 69 which causes forks 77 to raise the pallet off of chains 22 and up to the top of the machine at the level of plate 93. At the initial position of the cycle of operations, swinging gate 101 is up and pusher bar 102 is retracted, thus providing guides for the passage of cans from chutes 91 and 92 across the width of plate 93. When the farthermost can strikes limit switch 97, a relay is set which permits the pusher bar 102 to advance, as soon as the operator pushes the third button 153. The presence of pin 96 on plate 93 insures staggering of the second row of cans relative to the first. As soon as the row of cans is filled, the operator pushes button 153 which causes gate 101 to drop and pusher bar 102 to advance, guide bar 126 being in downward position in advance of the cans and preventing the cans from tipping rearwardly. The stroke of pusher bar 102 is sufficient to push the cans off of the plate 93, the distance of movement depending upon the diameters of the cans.

In the return stroke of pusher bar 102, ramps 132 are raised which raises the guide bar 121 out of contact with the cans so that they are not tipped backwardly. While the pusher bar 102 has been in advance position, trailing member 162 has blocked further discharge of cans from the chutes. However, as soon as the pusher bar reaches its retracted position, cans move out of chutes 91 and 92 across plate 93. The cycle of movement of the pusher bar 102 is repeated until the whole surface of the pallet is filled with cans.

When the furthermost row of cans has intercepted the beam of lamp 86, the elevator station motor 68 is reversed and the pallet dropped the height of one can. A fiberboard separator 16 is installed on top of the previous layer and a second layer of cans is deposited on top of the separator in the identical manner that the first layer was deposited. The pallet is filled layer by layer until a maximum desired height is reached; thereupon the operator depresses the elevator until the pallet is deposited on chains 22.

The operator then moves the chains 21, 22, 23 to take away the filled pallet to the rear of the machine and bring a new pallet from the front of the machine into the elevator station. After the pallet has been filled, workmen may install a jacket around the sides and top in a manner heretofore described.

Although the foregoing invention has been described in some detail by way of illustration and example for purpose of clarity of understanding, it is understood that certain changes and modifications may be practiced within the spirit of the invention and scope of the appended claims.

What is claimed is:

1. In a can palletizing machine, a horizontal conveyor for moving a pallet from a first position to a second position rearward of said first position, an elevator for raising said pallet upwardly from said second position and then lowering said pallet in increments, electric means for actuating said elevator, an electric circuit for said electric means, switch means in said circuit actuated dependent on the height of cans being handled whereby said pallet is lowered in increments equal to said height, a can loading mechanism at the top of said elevator, said mechanism comprising a horizontal platform alongside said elevator, guide means for guiding at least one row of cans onto said platform, a shaft, means for rotating said shaft, a crank on said shaft, a pusher bar reciprocable across said platform, means articulately connecting said crank and said pusher bar to push a row of cans off said platform and onto a pallet on said elevator, a ramp adjacent to the path of movement of said pusher bar and extending parallel to said path in plan and diverging upwardly-rearwardly of said path in side elevation, a first leg on said machine at the end of said ramp at the inward position of said pusher bar, first vertically adjustable means for securing said ramp to said first leg, a vertically reciprocable second leg secured to the end of said ramp opposite said first leg, second vertically adjustable means securing said ramp to said second leg, cam means on said shaft for reciprocating said second leg, a guide bar extending transversely across said machine at the level of the top edges of said cans, said guide bar located between said pusher bar and said elevator, and links pivotally interconnecting said guide bar and said pusher bar for horizontal movement with said pusher bar, said links engaging said ramp to raise said guide bar as said second leg is raised by said cam means, said first and second vertically adjustable means being adjustable depending upon the height of cans being palletized.

2. A machine according to claim 1, in which said switch means comprises a photo-electric cell positioned adjacent one rear corner of said can loading mechanism approximately at the level of said platform, a source of light directed at said cell positioned adjacent said corner and diagonally opposite said cell, whereby a can located in said corner interrupts said source, said cell actuating said switch means to lower said pallet when a full layer of cans is deposited on said pallet and to discontinue lowering said pallet after said pallet has been lowered a distance equal to the height of a can.

3. A machine according to claim 1, in which said means articulately connecting said crank and said pusher bar comprises a link, and means for rotatably securing said link to said crank in a plurality of positions, whereby the stroke of said pusher bar is adjustable for different can diameters.

4. A machine according to claim 1, which further comprises a gate along the inner edge of said platform, second cam means on said shaft, and means actuated by said second cam means for pivotally moving said gate about a horizontal axis along said edge between an elevated upright position raised along the inner edge of said platform and a depressed horizontal position below the level of said platform in timed relation to movement of said pusher bar.

5. A machine according to claim 1, in which said means articulately connecting said crank and said pusher bar comprises a horizontal rod on one side of said machine connected at one end to said pusher bar, means mounting said rod for horizontal longitudinal reciprocation on said machine, and a connecting rod inter-connecting said horizontal rod and said crank.

6. A machine according to claim 5, which further comprises means for pivotally securing said connecting rod to said crank in a plurality of positions whereby the stroke of said pusher bar is adjustable for different can diameters.

7. In a can palletizing machine, a horizontal conveyor for moving a pallet from a first position to a second position rearward of said first position, an elevator for raising said pallet upwardly from said second position and then lowering said pallet in increments, said elevator comprising a pair of forks shaped to engage under a pallet, said forks located on one side of the machine, vertical guideways on said side of said machine, guide means on said forks for vertical reciprocable movement on said guideways, chains for raising and lowering said forks, electric means for moving said chains in unison, an electric circuit for said electric means, a switch in said circuit for lowering said forks, means actuating said switch to lower said forks the height of one layer of cans, and a can loading mechanism at the top of said elevator, said mechanism comprising a horizontal platform alongside said elevator, guide means for guiding at least one row of cans onto said platform, a pusher bar reciprocable across said platform and means for actuating said pusher bar to push a row of cans off said platform and onto a pallet on said elevator.

8. A machine according to claim 7, in which said horizontal conveyor is formed in horizontally spaced sections and said forks in lowered position fit between said sections.

References Cited by the Examiner
UNITED STATES PATENTS 1,654,706    1/1928    Schoen _____ 198—31.2 X
3,022,904    2/1962    Shires.
3,113,771    12/1963    Tucci.

GERALD M. FORLENZA, *Primary Examiner.*

MORRIS TEMIN, HUGO O. SCHULZ, *Examiners.*